United States Patent
Kasai et al.

(10) Patent No.: US 8,605,069 B2
(45) Date of Patent: Dec. 10, 2013

(54) IMAGE DISPLAY DEVICE

(75) Inventors: Naruhiko Kasai, Yokohama (JP);
Masato Ishii, Tokyo (JP); Mitsuhide Miyamoto, Kawasaki (JP); Tohru Kohno, Kokubunji (JP); Hajime Akimoto, Kokubunji (JP)

(73) Assignees: Hitachi Displays, Ltd., Chiba (JP);
Panasonic Liquid Crystal Display Co., Ltd., Hyogo-Ken (JP)

( * ) Notice: Subject to any disclaimer, the term of this patent is extended or adjusted under 35 U.S.C. 154(b) by 1707 days.

(21) Appl. No.: 12/028,070

(22) Filed: Feb. 8, 2008

(65) Prior Publication Data
US 2008/0224962 A1   Sep. 18, 2008

(30) Foreign Application Priority Data

Mar. 16, 2007   (JP) ................................ 2007-067807

(51) Int. Cl.
  G09G 3/30   (2006.01)
(52) U.S. Cl.
  USPC .......................................... 345/211; 345/173
(58) Field of Classification Search
  None
  See application file for complete search history.

(56) References Cited

U.S. PATENT DOCUMENTS

| | | | |
|---|---|---|---|
| 5,610,629 A * | 3/1997 | Baur | 345/104 |
| 6,473,064 B1 * | 10/2002 | Tsuchida et al. | 345/82 |
| 6,518,962 B2 | 2/2003 | Kimura et al. | |
| 7,205,988 B2 | 4/2007 | Nakamura et al. | |
| 7,518,577 B2 | 4/2009 | Akimoto et al. | |
| 7,671,848 B2 | 3/2010 | Harada | |
| 2005/0110719 A1 * | 5/2005 | Satoh et al. | 345/76 |
| 2005/0200582 A1 * | 9/2005 | Goto et al. | 345/89 |
| 2006/0155913 A1 * | 7/2006 | Nishikawa et al. | 711/100 |
| 2007/0215888 A1 * | 9/2007 | Mitsuhashi | 257/94 |

FOREIGN PATENT DOCUMENTS

| | | |
|---|---|---|
| JP | 2002-229513 | 8/2002 |
| JP | 2005-156697 | 6/2005 |
| JP | 2006-258562 | 9/2006 |
| JP | 2007-25796 | 2/2007 |
| WO | WO98/40871 | 9/1998 |

* cited by examiner

*Primary Examiner* — William Boddie
*Assistant Examiner* — Carolyn R Edwards
(74) *Attorney, Agent, or Firm* — Antonelli, Terry, Stout & Kraus, LLP.

(57) ABSTRACT

An image display device includes switches directly connected a constant current source to a self-luminous element to be able to detect a characteristic of the self-luminous element, generate a coordinates and convert information of the characteristic and coordinates into a system communication signal, transferring an input with a temperature variation to a system side.

4 Claims, 12 Drawing Sheets

IMAGE DISPLAY DEVICE

CLAIM OF PRIORITY

The present application claims priority from Japanese Application No. 2007-067807 filed on Mar. 16, 2007, the content of which is hereby incorporated by reference into this application.

BACKGROUND OF THE INVENTION

The present invention relates to an image display device having self-luminous elements thereon, such as EL (Electroluminescence) elements, organic EL elements, etc., and a driving method of the same.

The self-luminous element typified by the EL element, organic EL element, etc. has a property such that a luminance of the element is proportional to a current amount flown into the self-luminous element. Therefore, a gradation display can be realized by controlling the current amount flown into the element. A plurality of self-luminous elements as described above are arranged, so that a display device can be realized.

On the other hand, a touch panel has been used as a technique for applying an input function to a display device. However, there arises a problem such as degradation for a display quality, for example, a luminescence etc., and cost increase, since the touch panel is laminated on the surface of display device.

As for a means of solving the problem, U.S. Pat. No. 7,205,988 has disclosed a technique to give a display device an input function by housing an optical sensor in the display device, without laminating a device such as a touch panel.

However, the technique disclosed in U.S. Pat. No. 7,205,988 requires to additionally form a photodiode on a glass board in a display area of a liquid-crystal display, separately or other than display elements. This causes a transmission factor to make lowered. Even in the case where the technique is applied to the foregoing self-luminous display device, a power consumption could be increased, and a life of the display device could also be lowered, since an aperture ratio is made lowered.

SUMMARY OF THE INVENTION

An object of the invention is to provide an input function-integrated image display device having a touch panel or the like and a driving method of the same, in which a temperature characteristic of a self-luminous element used for a display is measured to be able to detect coordinates of the self-luminous element that occurs a characteristic variation, without adding a newly sensed device in a display area of the display device.

According to the invention, an image display device comprises power sources each independently used for a display and a detection, a switch which independently connects the power source with each of display elements, a circuit which controls the switch, a function which reads out states of the respective display elements, a detecting function which compares voltages detected from the display elements, and a coordinates generating function which generates a position of a detected result of each display element.

According to the invention, an image display device comprises a display constituted by a plurality of display pixels, a signal line which inputs a display signal voltage to a pixel area, a display control circuit which controls the display signal voltage, and an output line which outputs a pixel state in the pixel area. The image display device further provides a detection use power source, a changeover switch, a detecting circuit, and a coordinates conversion circuit, for the pixel area, in which the detection use power is connected with the display pixel via the output line and change-over switch, the output line is connected with the detecting circuit, the detecting circuit is connected with a detecting information storing circuit, and the detecting information storing circuit is connected with the display control circuit. Therefore, a rise in temperature and a coordinates for every pixel are detected and transferred as information to a system side, so that the image display device can be used as an input device.

According to the invention, the self-luminous display device having the input function such as a touch panel can be provided by detecting a temperature characteristic of the self-luminous element, while the degradation of aperture ratio, increase of power consumption, and degradation of life are restrained without adding a newly sensed device in the display area of display device.

Other objects, features and advantages of the invention will become apparent from the following description of the embodiments of the invention taken in conjunction with the accompanying drawings.

DESCRIPTION OF THE EMBODIMENTS

Hereinafter, first and second embodiments of the invention will be described with reference to the drawings.

[First Embodiment]

Figure 1:
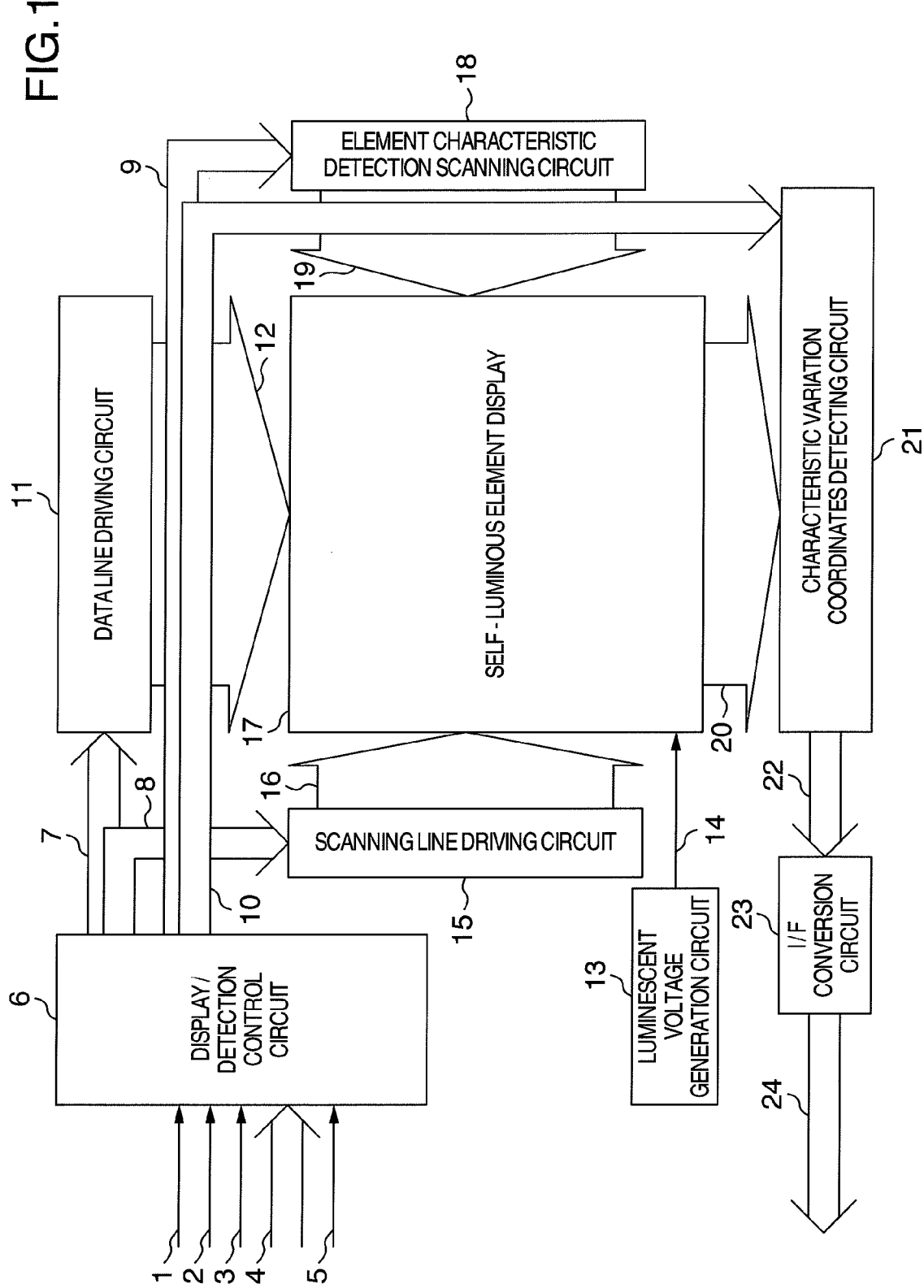
FIG. 1 is a block diagram showing an example of a self-luminous element display device in a first embodiment of the invention.

FIG. 1 shows an example of a self-luminous element display device in the first embodiment of the invention. Referring to FIG. 1, a reference numeral 1 denotes a horizontal sync signal; 2, a vertical sync signal; 3, a data enable signal; 4, display data; and 5, a sync clock. The horizontal sync signal 1 is a signal of one-screen period (one frame period) of a display. The vertical sync signal 2 is a signal of one-horizontal period. The data enable signal 3 is a signal indicating a time period (display effective time period) during which the display data 4 is effective. All of the foregoing signals are inputted in synchronization with the sync clock 5. In the case of this embodiment, a description will be concerned with the following assumption such that one-screen amount of the display data 4 is, in turn, transferred from a left-top end pixel on a screen by a raster scan method, and information of one pixel is constituted by 6-bit digital data. A reference numeral 6 denotes a display/detection control circuit; 7, a data line control signal; 8, a scanning line control signal; 9, a detection scanning line control signal; and 10, a detection line control signal. The display/detection control circuit 6 generates the data line control signal 7 and scanning line control signal 8, both of which are used for a display control, and the detection scanning line control signal 9 and detection line control signal 10, both of which are used for a characteristic detection of a display element as described later, from the horizontal sync signal 1, vertical sync signal 2, data enable signal 3, display data 4, and sync clock 5. A reference numeral 11 denotes a data line driving circuit; and 12, a data line driving signal. The data line driving circuit 11 generates a signal voltage to be written into a pixel (as described later) constituted by a self-luminous element in accordance with the data line control signal 7, and a triangular wave signal (as described later) to then output as the data line driving signal 12. A reference numeral 13 denotes a luminescent voltage generation circuit; and 14, a luminescent voltage. The luminescent voltage generation circuit 13 generates a power source voltage to supply a current for producing a luminescence of a self-luminous element (as described later) to then output as the luminescent voltage 14. A reference numeral 15 denotes a scanning line driving circuit; 16, a scanning line selection signal; and 17, a self-luminous element display. The self-luminous element display 17 is a display using a light-emitting diode, an organic EL, etc., as a display element. The self-luminous element display 17 is constituted by a plurality of self-luminous elements (pixel portion) arranged in a matrix configuration. A display operation to the self-luminous element display 17 is performed by the following manner. That is, a pixel is selected by the scanning line driving signal 16 outputted from the scanning line driving circuit 15, and data is written into the pixel based on the signal voltage in response to the data line driving signal 12 outputted from the data line driving circuit 11. The foregoing operation is performed in accordance with the triangular wave signal. A voltage for driving the self-luminous element is supplied as the luminescent voltage 14. In addition, both the data line driving circuit 11 and scanning line driving circuit 15 may be realized respectively by LSIs, but by a single LSI. Both the circuits may also be formed on a glass board which is the same as the pixel portion. In the case of this embodiment, a description will be concerned with the following assumption so that the self-luminous element display 17 has a resolution of 240×320 dots, and one dot is constituted by three pixels consisting of R (Red), G (Green) and B (Blue) in the order from the left thereof, that is, the display in the horizontal direction is constituted by 720 pixels. The self-luminous element display 17 can control a luminance produced from the self-luminous element by a current amount flown into the self-luminous element and a luminous time of the self-luminous element. That is, the greater the current amount flown in to the self-luminous element, the higher the luminance of the self-luminous element becomes, and the longer the luminous time of the self-luminous element, the higher the luminance of the self-luminous element becomes. A reference numeral 18 denotes an element characteristic detection scanning circuit; and 19, a detection scanning line selecting signal. The element characteristic detection scanning circuit 18 generates the detection scanning line selecting signal 19 for selecting a scanning line to detect presence or absence of a defect for the self-luminous element on the self-luminous element display 17. A reference numeral 20 denotes a detected line output signal; 21, a characteristic variation coordinates detecting circuit; and 22, a characteristic variation coordinates signal. The detected line output signal 20 is outputted as the characteristic variation coordinates signal 22 corresponding to a signal indicative of a characteristic and coordinates of that. The characteristic and coordinates are detected from the characteristic variation coordinates detecting circuit 21 on the basis of a detected result indicating the presence or absence of a defect for the self-luminous element on one-horizontal line selected by the detection scanning line selecting signal 19 of the self-luminous element display 17. A reference numeral 23 denotes an I/F conversion circuit; and 24, a system communication signal. The I/F conversion circuit 23 converts the characteristic variation coordinates signal 22 into a communication I/F exchanged with the system side to output as the system communication signal 24. In the case of this embodiment, a description will be concerned with an the following assumption so that the system communication signal 24 is used with a general-purpose I/F (for example, USB).

Figure 2:
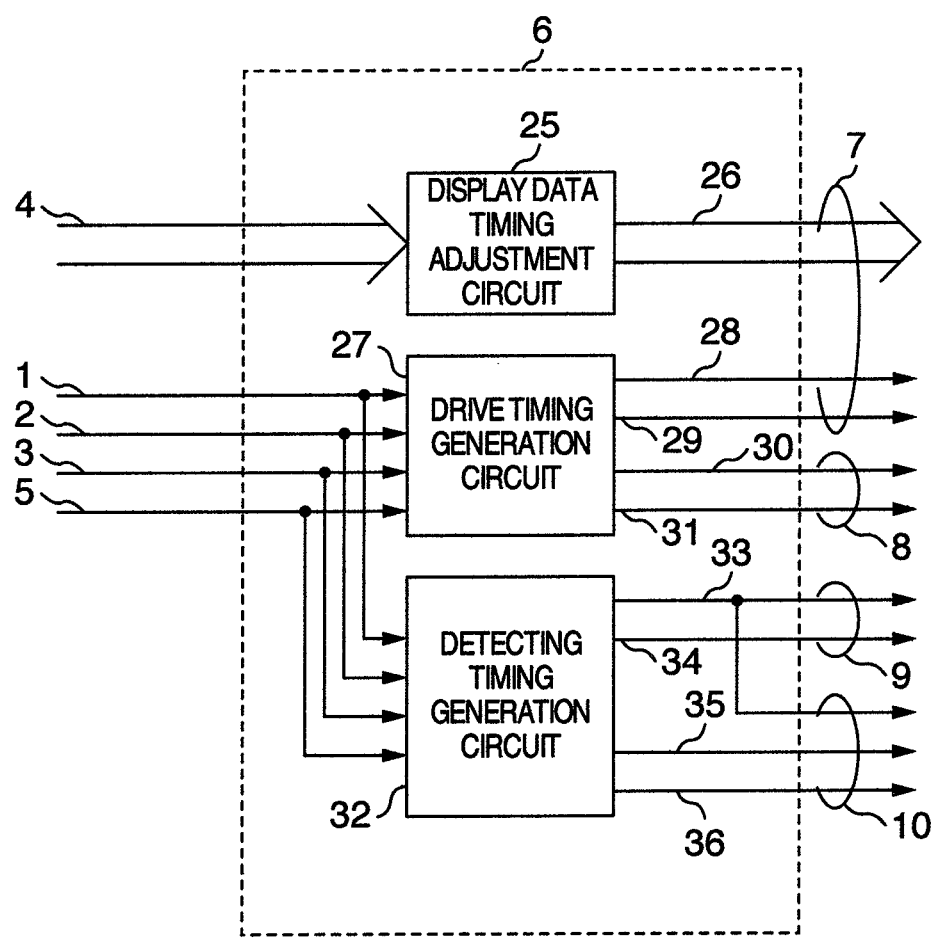
FIG. 2 is a block diagram showing an internal constitution of a display/detection control circuit 6 shown in FIG. 1 of the first embodiment.

FIG. 2 shows an internal constitution of the display/detection control circuit 6 shown in FIG. 1 of this embodiment. Referring to FIG. 2, a reference numeral 25 denotes a display data timing adjustment circuit; and 26, a data line control display data. The display data timing adjustment circuit 25 performs a timing adjustment so that the display data 4 is synchronized with a drive timing as described later, and outputs as the data line control display data 26. A reference numeral 27 denotes a drive timing generation circuit; 28, a horizontal start signal; 29, a horizontal shift clock; 30, a vertical start signal; and 31, a vertical shift clock. Similarly to a conventional system, the drive timing generation circuit 27 generates the horizontal start signal 28 indicating a start of a display horizontal position, the horizontal shift clock 29 which takes a timing to latch the display data 4 for every pixel, the vertical start signal 30 indicating a start of a display vertical position, and the vertical shift clock 31 which, in turn, shifts a scanning line selection. A reference numeral 32 denotes a detection timing generation circuit; 33, a vertical detection start signal; 34, a vertical detection shift clock; 35, a horizontal detection start signal; and 36, a horizontal detection shift clock. The detection timing generation circuit 32 generates the vertical detection start signal 33 indicating a start of a detection operation in the vertical direction, the vertical detection shift clock 34 which, in turn, shifts a detection scanning line, the horizontal detection start signal 35 indicating a start of a detection horizontal position, and the horizontal detection shift clock 36 which, in turn, shifts the detection horizontal position.

Figure 3:
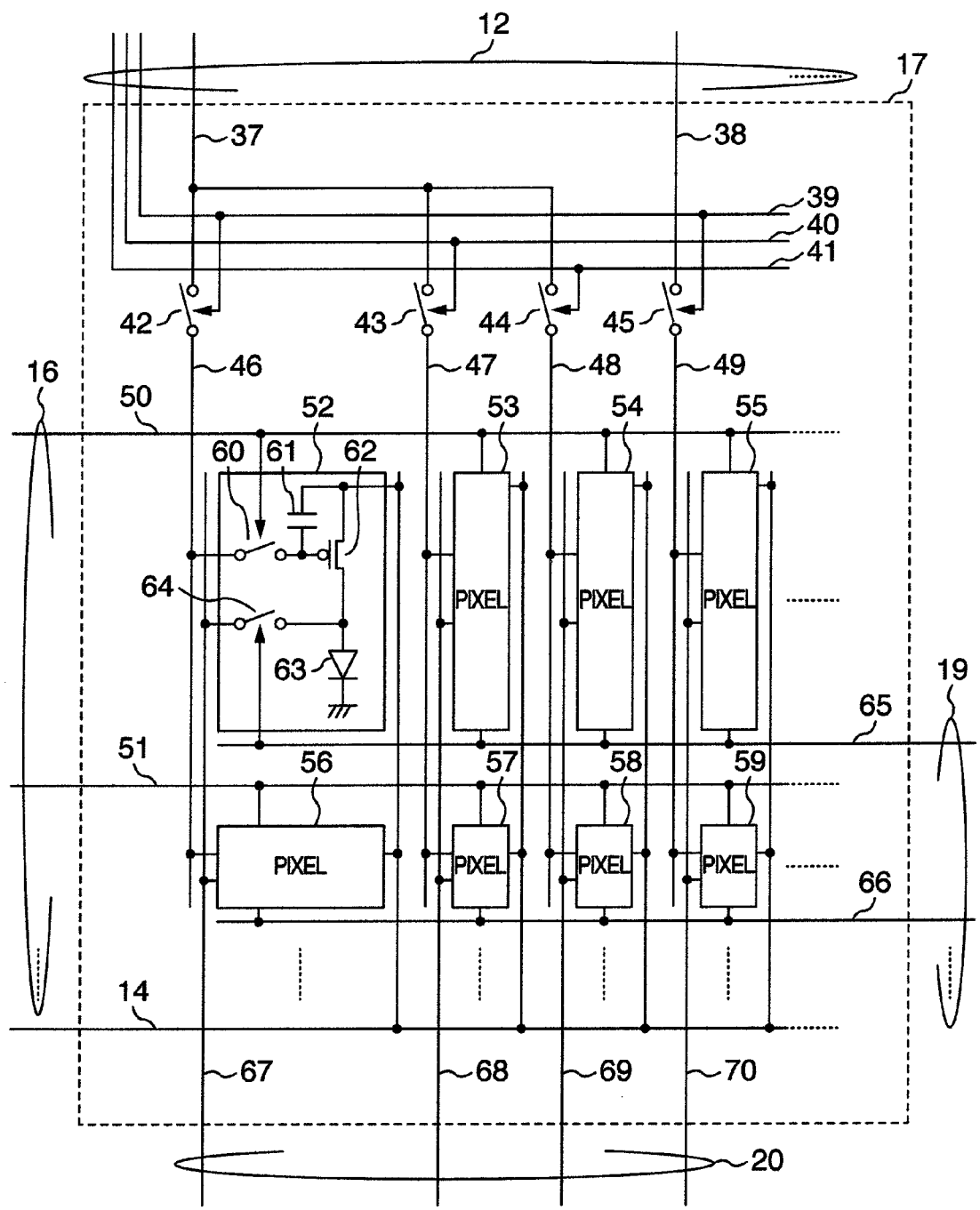
FIG. 3 is a circuit diagram showing an internal constitution of a self-luminous element display 17 shown of FIG. 1 in the first embodiment.

FIG. 3 shows an internal constitution of the self-luminous element display 17 shown in FIG. 1 of this embodiment. An example of using an organic EL element is shown as a self-luminous element. Referring to FIG. 3, a reference numeral 37 denotes a first data line output; 38, a second data line output; 39, an R selection signal; 40, a G selection signal; 41, a B selection signal; 42, a first R selection switch; 43, a first G selection switch; 44, a first B selection switch; and 45, a second R selection switch. The first data line output 37 is connected with the first R selection switch 42 which is switched by the R selection signal 39, the first G selection switch 43 which is switched by the G selection signal 40, and the first B selection switch 44 which is switched by the B selection signal 41. Similarly, all of the data line outputs from a second data line output up to a 240th data line output are connected with the selection switches of RGB, respectively. In this embodiment, the R selection signal 39, G selection signal 40 and B selection signal 41 are signals, each of which becomes "On" state within one-horizontal time period divided into three timings. The following description will be concerned with assumption such that a signal voltage is outputted to three data lines of RGB by a single data line output. A reference numeral 46 denotes a first R data line; 47, a first G data line; 48, a first B data line; 49, a second R data line; 50, a first scanning line; 51, a second scanning line; 52, a first row/first column R pixel; 53, a first row/first column G pixel; 54, a first row/first column B pixel; 55, a first row/second column R pixel; 56, a second row/first column R pixel; 57, a second row/first column G pixel; 58, a second row/first column B pixel; and 59, a second row/second column R pixel. The first R data line 46, first G data line 47, first B data line 48, and second R data line 49 are data lines for inputting the signal voltages into the pixels, respectively. The first scanning line 50 and second scanning line 51 are signal lines for inputting a first scanning line selection signal and a second scanning line selection signal (as described later) into the pixels. Therefore, the signal voltage is written into the pixels selected on scanning lines by the respective scanning selection signals via the respective data lines, so that the luminance of pixel can be controlled in accordance with the signal voltage. At this time, the luminescent power source becomes the luminescent voltage 14. Here, the internal constitution of the pixel is illustrated for the first row/first column R pixel 52 alone, but the internal constitution of the same is adapted to the first row/first column G pixel 53, first row/first column B pixel 54, first row/second column R pixel 55, second row/first column R pixel 56, second row/first column G pixel 57, second row/first column B pixel 58, and second row/second column R pixel 59. A reference numeral 60 denotes a data write switch; 61, a write capacitor; 62, a driving transistor; and 63, an organic EL element. The data write switch 60 in turned to On-state by the first scanning line 50 to accumulate the signal voltage from the first R data lien 46 in the write capacitor 61. The driving transistor 62 supplies a driving current in response to the signal voltage accumulated in the write capacitor 61 to the organic EL element 63. Therefore, the luminance of organic EL element 63 is determined by the signal voltage written in the write capacitor 61 and the luminescent voltage 14. Further, the number of pixels on the self-luminous element display 17 is defined by the resolution of 240×320 dots, as previously described, therefore, the number of scanning lines is 320 in which the horizontal lines are formed from a first line to a 320th line in the vertical direction, and the number of data lines for each of R, G and B in the vertical direction is 240 in which the vertical lines are formed from a first dot up to a 240th dot in the horizontal direction, that is, the total number of data lines is 720 (240×3) lines. A reference numeral 64 denotes a detection switch; 65, a first detection scanning line; 66, a second detection scanning line; 67, a first detection line; 68, a second detection line; 69, a third detection line; and 70, a fourth detection line. The detection switch 64 is a switch for outputting a characteristic of the organic EL element 63 to the first detection line 67 when the switch 64 is selected by the first detection scanning line 65. Similarly, for a purpose of outputting characteristics of other organic EL elements, the second detection scanning line 66, second detection line 68, third detection line 69, and fourth detection line 70 are connected with the other organic EL elements via the detection switches of the respective pixels. In also this case, the following description will be concerned with assumption such that the detection lines are formed by 720 lines.

Figure 4:
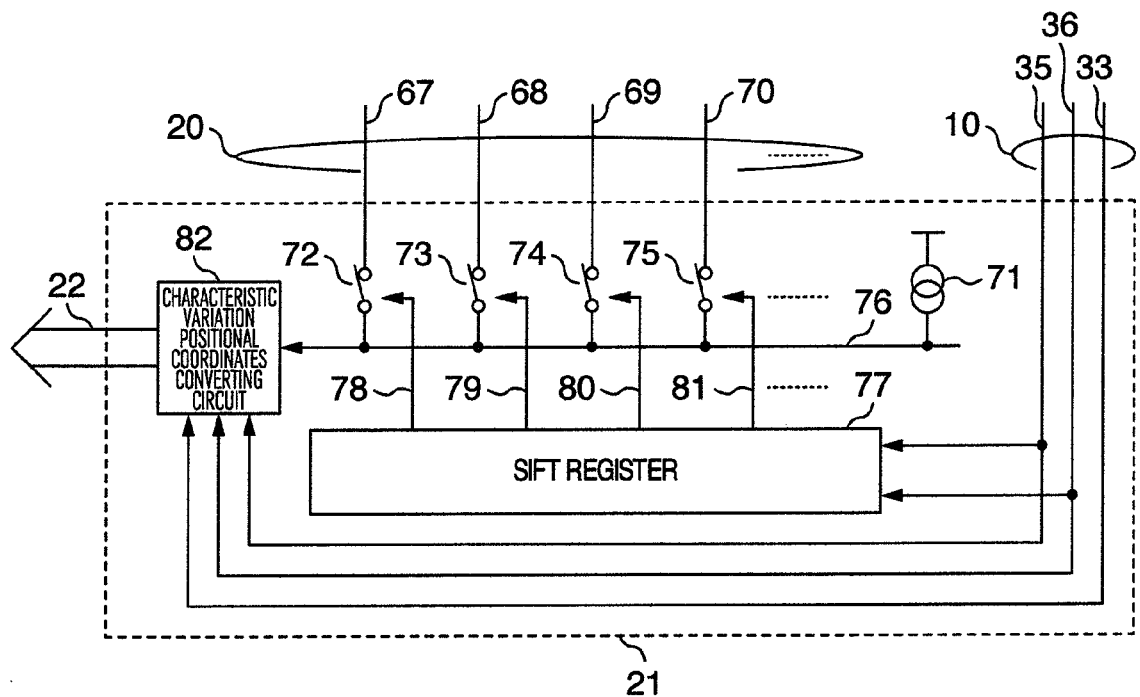
FIG. 4 is a circuit diagram showing an internal constitution of a characteristic variation coordinates detecting circuit 21 shown in FIG. 1 of the first embodiment.

FIG. 4 shows an internal constitution of the characteristic variation coordinates detecting circuit 21 shown in FIG. 1 of this embodiment. Referring to FIG. 4, a reference numeral 71 denotes a detection use power source; 72, a first detection line switch; 73, a second detection line switch; 74, a third detection line switch; 75, a fourth detection line switch; and 76, a detection output line. The first detection line switch 72, second detection line switch 73, third detection line switch 74, and fourth detection line switch 75 respectively output the characteristics of organic EL elements to the detection output line 76 by in turn shifting a selection of the switches in accordance with a shift register (described later) to connect the detection use power source 71, as a constant current source, to the first detection line 67, second detection line 68, third detection line 69, fourth detection line 70, . . . and 720th detection line. The detection use power source 71 is a circuit to output a power in which either a current is constant or a current variation is in a predetermined range. A reference numeral 77 denotes a shift register; 78, a first detection line selecting signal; 79, a second detection line selecting signal; 80, a third detection line selecting signal; and 81, a fourth detection line selecting signal. The shift register 77 outputs the first detection line selecting signal 78, second detection line selecting signal 79, third detection line selecting signal 80 and fourth detection line selecting signal 81 for in turn switching the foregoing detection line switches in response to the horizontal detection start signal 35 and horizontal detection shift clock 36. A reference numeral 82 denotes a characteristic variation positional coordinates converting circuit from which positional information of a pixel in accordance with the horizontal detection start signal 35, horizontal detection shift clock 36 and vertical detection start signal 33, and characteristic variation information of the organic EL element in turn outputted from the detection output line 76 are outputted as the characteristic variation coordinates signal 22.

Figure 5:
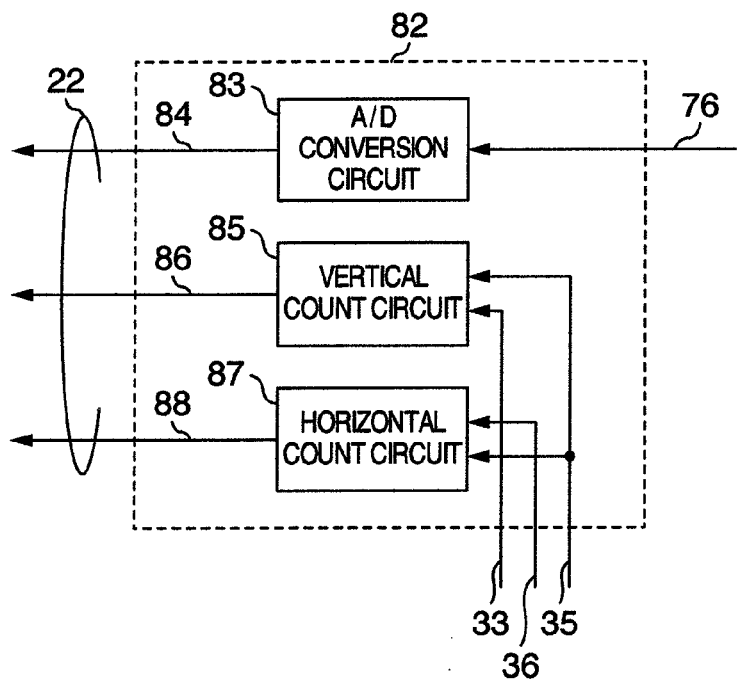
FIG. 5 is a circuit diagram showing an internal constitution of a characteristic variation positional coordinates converting circuit 82 shown in FIG. 4 of the first embodiment.

FIG. 5 shows an internal constitution of the characteristic variation positional coordinates converting circuit 82 shown in FIG. 4 of this embodiment. A reference numeral 83 denotes an A/D conversion circuit; and 84, a characteristic variation detected result. The A/D conversion circuit converts, to digital data, the characteristic variation of organic EL element which is outputted as an analog value (voltage) to the detection output line 76 to output as the characteristic variation detected result 84. A reference numeral 85 denotes a vertical count circuit; 86, a vertical coordinates signal; 87, a horizontal count circuit; and 88, a horizontal coordinates signal. The vertical count circuit 85 counts the number of horizontal detection start signal 35 as the basis for the vertical detection start signal 33 to output as the vertical coordinates signal 86 indicating a vertical position of the characteristic variation detected result 84. The horizontal count circuit 87 counts the number of horizontal detection shift clock 36 as the basis for the horizontal detection start signal 35 to output as the horizontal coordinates signal 88 indicating a horizontal position of the characteristic variation detected result 84.

Figure 6:
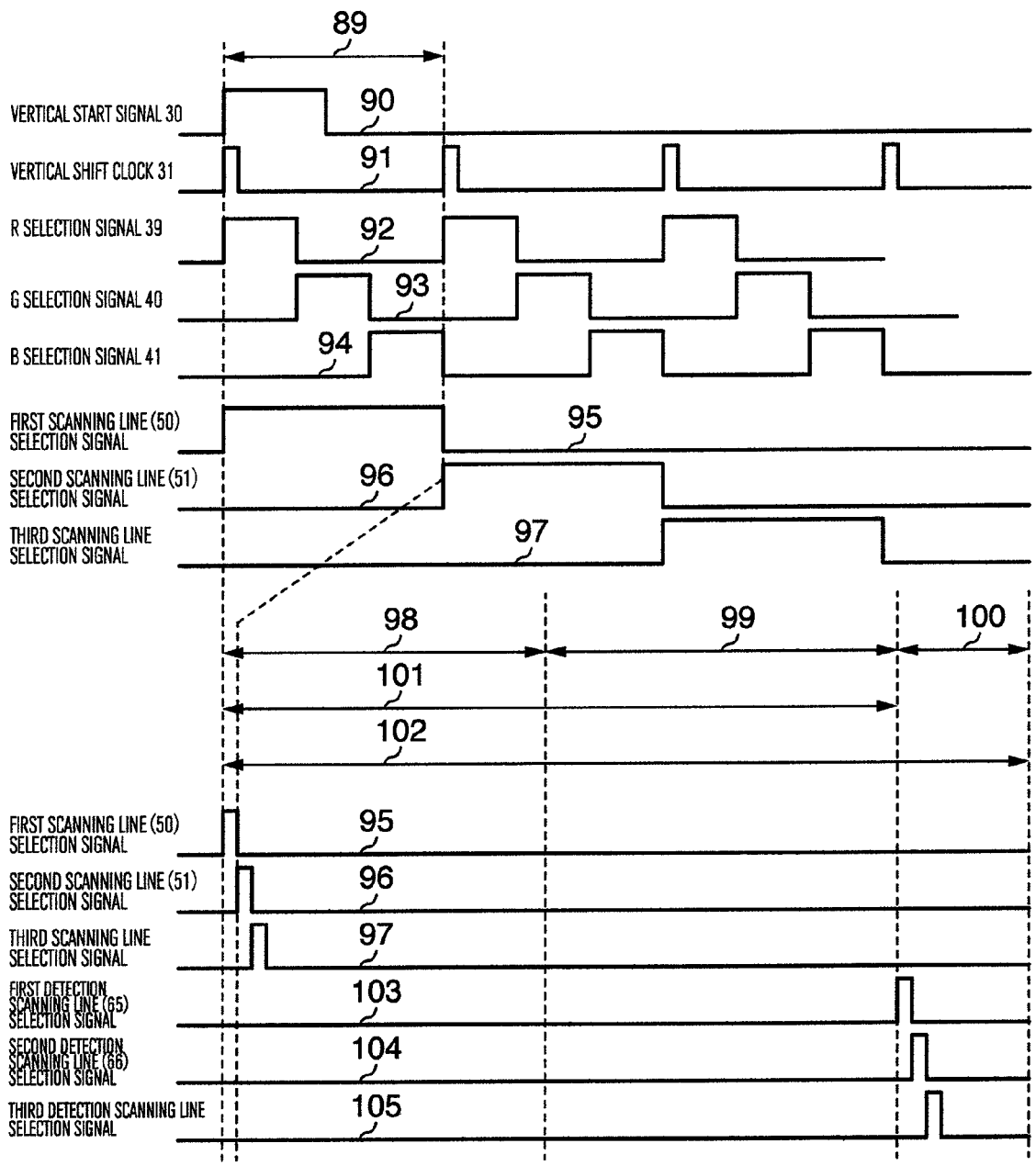
FIG. 6 is a timing chart showing an operational example for the display and detection of a scanning line driving circuit 15, element characteristic detection scanning circuit 18 and the characteristic variation coordinates detecting circuit 21 of FIG. 1, particularly showing an operation relative to the display.

FIG. 6 is a time chart showing operations in a display and detection, particularly for an operation relative to the display, of the scanning line driving circuit 15, element characteristic detection scanning circuit 18, and characteristic variation coordinates detecting circuit 21. Referring to FIG. 6, a reference numeral 89 denotes a one-horizontal time period; 90, a vertical start signal waveform; 91, a vertical shift clock waveform; 92, an R selection signal waveform; 93, a G selection signal waveform; 94, a B selection signal waveform; 95, a first scanning line selection signal waveform; 96, a second scanning line selection signal waveform; and 97, a third scanning line selection signal waveform. Similarly to the conventional manner, the vertical start signal waveform 90 is, in turn, shifted in response to the vertical shift clock waveform 91 to form the first scanning line selection signal waveform 95, second scanning line selection signal waveform 96, and third scanning line selection signal waveform 97. On the one-horizontal time period 89, the respective scanning line selection signals are turned to a "high" state, and the R selection signal waveform 92, G selection signal waveform 93 and B selection signal waveform 94 are also turned to the "high" state, as the one-horizontal time period 89 is divided into three waveforms. A reference numeral 98 denotes a display signal write time period; 99, a display fly-back time period; 100, a detection time period; 101, a display driving time period; 102, one-display time period; 103, a first detection scanning line selection signal waveform; 104, a second detection scanning line selection signal waveform; and 105, a third detection scanning line selection signal waveform. The display signal write time period 98 is a write time period during which data signals are written by selecting all of the scanning lines for one-screen amount by the respective scanning line selection signals. The display fly-back time period 99 is a time period from when the write of the data signals is completed to when a detection operation is started, and is also a time period during which all of the pixels produce luminescence. Here, a time period by joining the display signal write time period 98 with the display fly-back time period 99 is the display driving time period 101. On the detection time period 100, the detection scanning line selection signals are, in turn, turned to the "high" state, and a time period by joining the display driving time period 101 with the detection time period 100 becomes the one-display time period 102. This is a period time called one frame in general.

Figure 7:
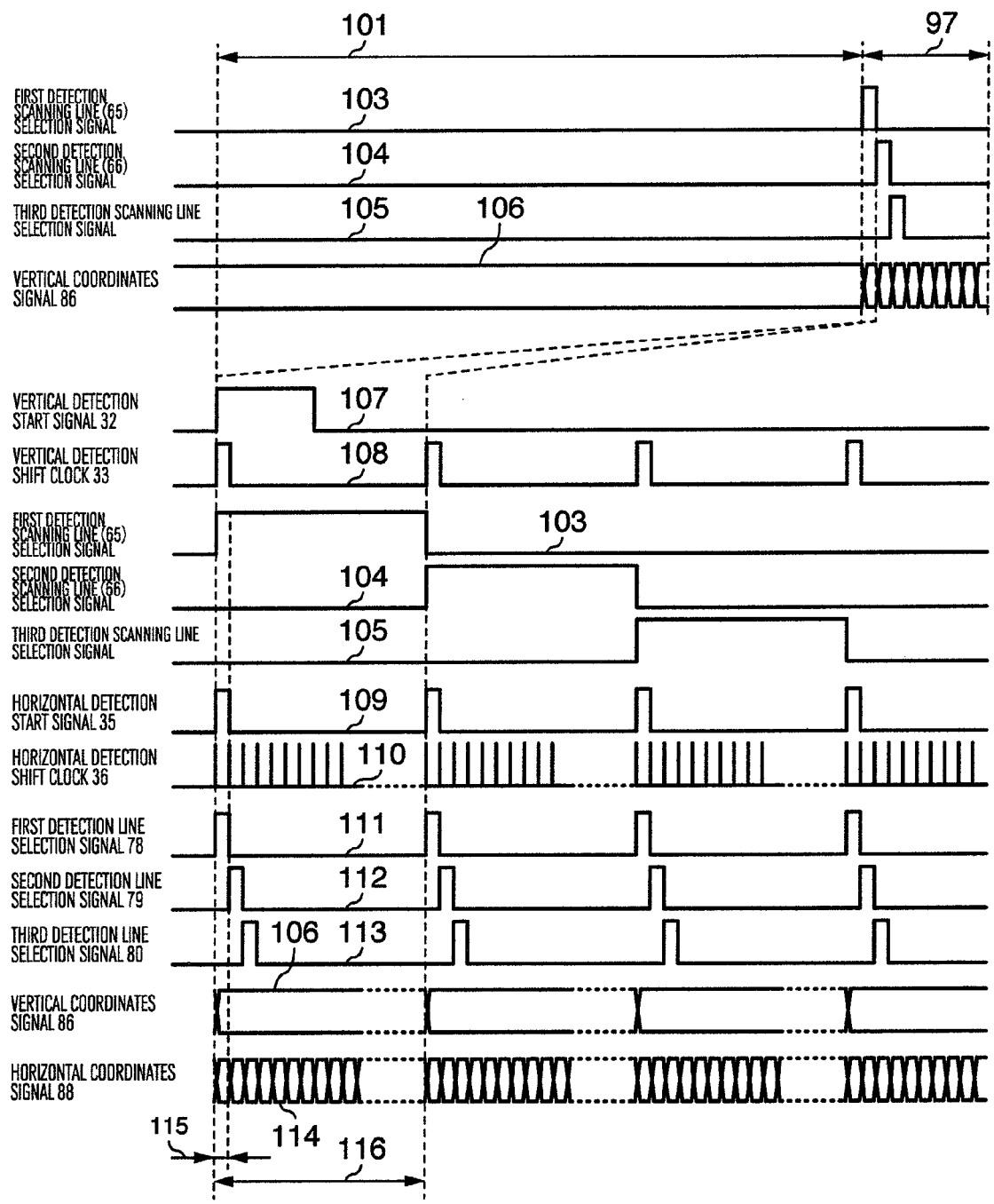
FIG. 7 is a timing chart showing an operational example for the display and detection of the scanning line driving circuit 15, element characteristic detection scanning circuit 18 and the characteristic variation coordinates detecting circuit 21 of FIG. 1, particularly showing an operation relative to the detection.

FIG. 7 is a time chart showing an operation in the display and detection of the scanning line driving circuit 15, element characteristic detection scanning circuit 18 and characteristic variation coordinates detecting circuit 21, shown in FIG. 1 of this embodiment. A reference numeral 106 denotes a vertical coordinates signal waveform; 107, a vertical detection start signal waveform; and 108, a vertical detection shift clock waveform. On the detection time period 100, the vertical detection start signal waveform 107 is, in turn, shifted in response to the vertical detection shift clock waveform 108 to obtain the first detection scanning line selection signal waveform 103, second detection scanning line selection signal waveform 104 and third detection scanning line selection signal waveform 105, so that the vertical coordinates signal waveform 106 indicating positions of detection scanning lines selected on periods of the respective "high" states of the waveforms 103, 104 and 105 can be obtained. A reference numeral 109 denotes a horizontal detection start signal waveform; 110, a horizontal detection shift clock waveform; 111, a first detection line selection signal waveform; 112, a second detection line selection signal waveform; 113, a third detection line selection signal waveform; 114, a horizontal coordinates signal waveform; 115, a one-pixel characteristic detection time period; and 116, a one-horizontal line characteristic detection time period. On the one-horizontal line characteristic detection time period 116, the horizontal detection start signal waveform 109 is, in turn, shifted in response to the horizontal detection shift clock waveform 110 to form the first detection line selection signal waveform 111, the second detection line selection signal waveform 112 and the third detection line selection signal waveform 113, in which these waveforms 111, 112 and 113 become the "high" state on the one-pixel characteristic detection time period 115, so that the horizontal coordinates signal waveform 114 indicating positions of detection lines to be selected can be obtained.

Figure 8:
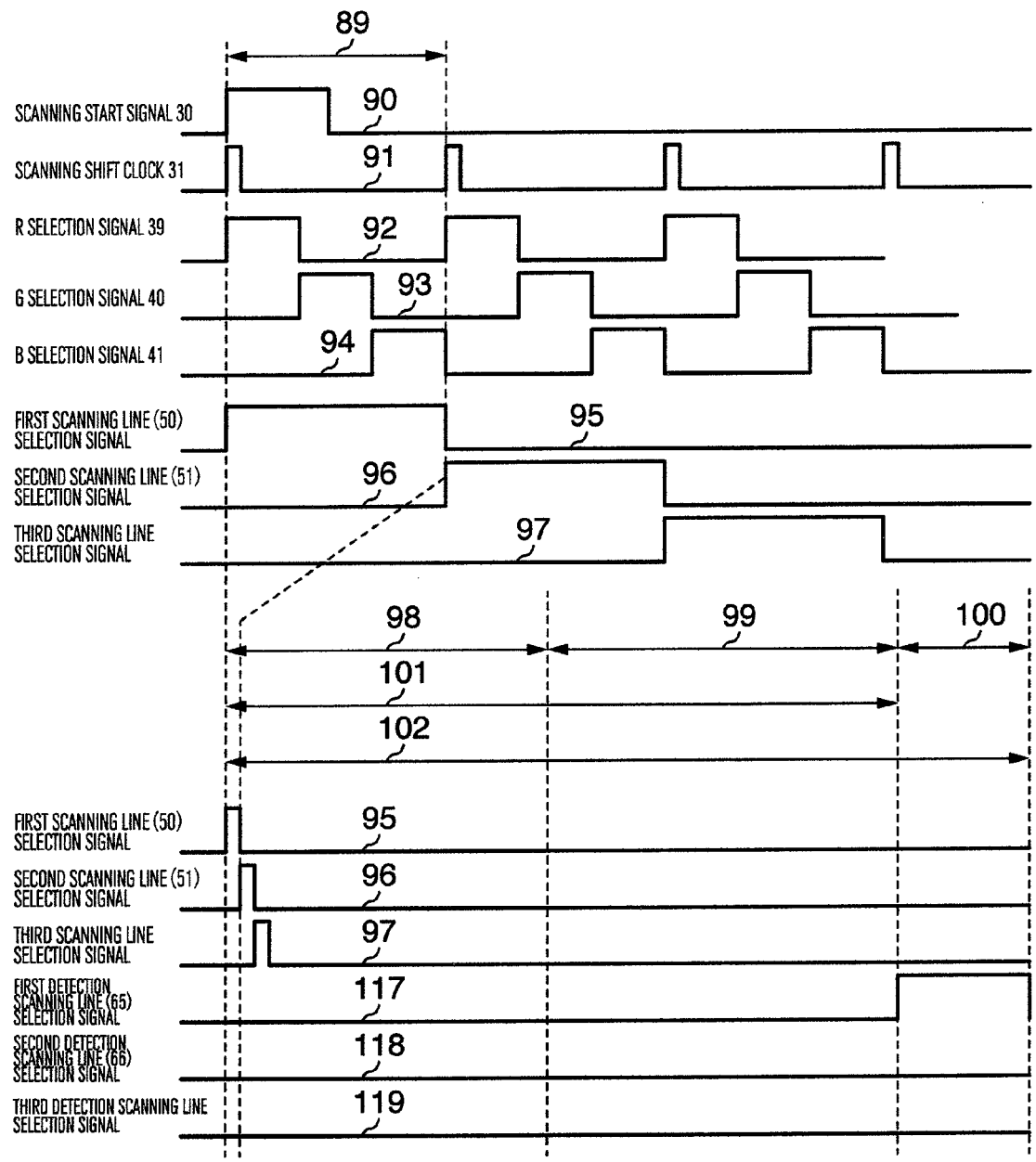
FIG. 8 is a timing chart showing an operational example of a case where the operation of the scanning line driving circuit 15, element characteristic detection scanning circuit 18 and the characteristic variation coordinates detecting circuit 21 of FIG. 1 in the display and detection is performed in a low speed compared with the case shown in FIG. 6, particularly showing the operation relative to the display.

FIG. 8 is a time chart showing an operation of the scanning line driving circuit 15, element characteristic detection scanning circuit 18 and characteristic variation coordinates detecting circuit 21 in the case where the operation in the display and detection is performed in a low speed compared with that in FIG. 6, particularly showing an operation in relation to the display. A reference numeral 117 denotes a first detection scanning line selection signal waveform at a low speed detection; 118, a second detection scanning line selection signal waveform at the low speed detection; and 119, a third detection scanning line selection signal waveform at the low speed detection. These detection scanning selection signal waveforms at the low speed detection are the "high" state on the detection time period 100, that is, the detection for an amount of one-scanning line is performed during the one-display time period 102.

Figure 9:
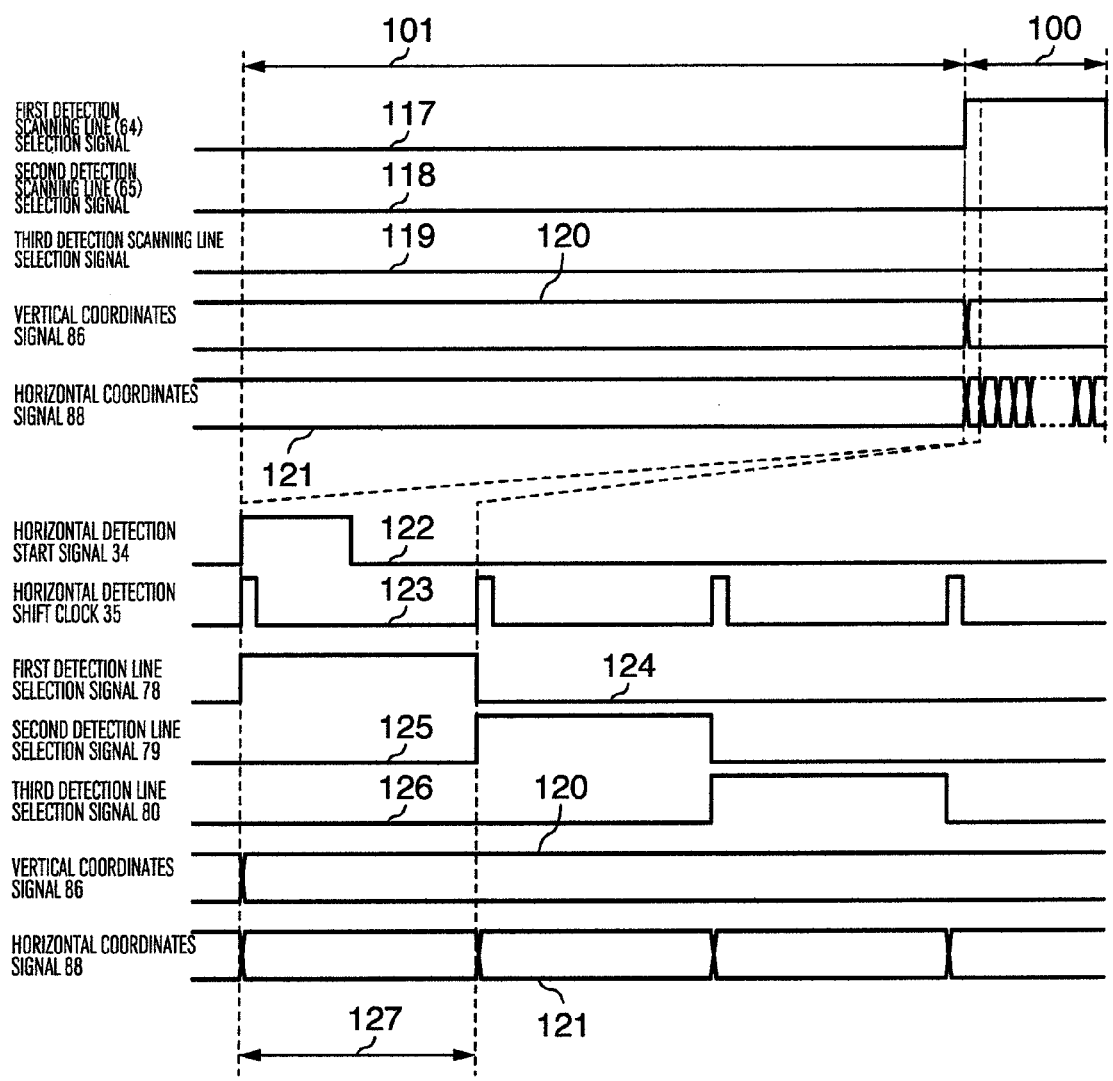
FIG. 9 is a timing chart showing an operational example of a case where the operation of the scanning line driving circuit 15, element characteristic detection scanning circuit 18 and the characteristic variation coordinates detecting circuit 21 of FIG. 1 in the display and detection is performed in a low speed compared with the case shown in FIG. 7, particularly showing the operation relative to the detection.

FIG. 9 is a time chart showing an operation of the scanning line driving circuit 15, element characteristic detection scanning circuit 18 and characteristic variation coordinates detecting circuit 21 in the case where the operation in the display and detection is performed in a low speed compared with that in FIG. 7, particularly showing an operation in relation to the detection. A reference numeral 120 denotes a vertical coordinates signal waveform at the low speed detection; 121, a horizontal coordinates signal waveform at the low speed detection; 122, a horizontal detection start signal waveform at the low speed detection; 123, a horizontal detection shift clock waveform at the low speed detection; 124, a first detection line selection signal waveform at the low speed detection; 125, a second detection line selection signal waveform at the low speed detection; 126, a third detection line selection signal waveform at the low speed detection; and 127, a one-pixel characteristic detection time period at the low speed detection. As described above, the vertical coordinates signal waveform 120 at the low speed detection indicating a position of a scanning line to be selected indicates one address since the detection for the amount of one-scanning line is performed on the detection period 100. Further, during this time period, the horizontal detection start signal waveform 122 at the low speed detection is, in turn, shifted in response to the horizontal detection shift clock waveform 123 at the low speed detection to form the first detection line selection signal waveform 124 at the low speed detection, second detection line selection signal waveform 125 at the low speed detection and third detection line selection signal waveform 126 at the low speed detection, in which these waveforms become the "high" state on the one-pixel characteristic detection time period 127 at the low speed detection, so that the horizontal coordinates signal waveform 121 at the low speed detection indicating detection lines to be selected can be obtained.

Figure 10:
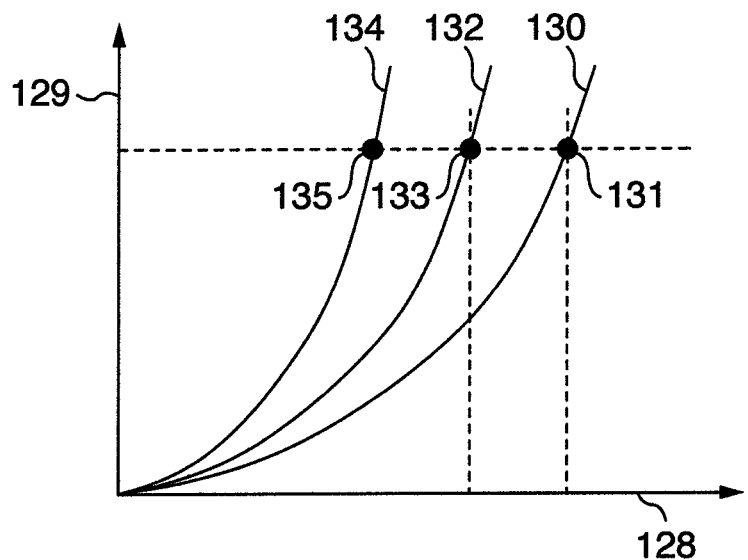
FIG. 10 is a characteristic diagram showing an example of an organic EL element 63 shown in FIG. 3.

FIG. 10 is a characteristic diagram showing a detection characteristic of the organic EL element 63 shown in FIG. 3 of the embodiment. Referring to FIG. 10, a reference numeral 128 denotes a voltage in abscissas; 129, a current in ordinate; 130, an organic EL element current to voltage characteristic at a low temperature; 131, a voltage in applying a constant current at the low temperature; 132, an organic EL element current to voltage characteristic at an intermediate temperature; 133, a voltage in applying a constant current at the intermediate temperature; 134, an organic EL element current to voltage characteristic at a high temperature; and 135, a voltage in applying a constant current at a high temperature. The organic EL element current to voltage characteristic 130 is a curve indicating a relationship between a voltage and current applied to the organic EL element 63 at the low temperature. Similarly, the characteristic 132 is a curve at the intermediate temperature, and the characteristic 134 is a curve at the high temperature. Here, in the case where the constant currents indicated on the organic EL element current to voltage characteristics 130, 132 and 134 are respectively applied to the organic EL element in response to the respective temperature conditions, the characteristic curves indicate characteristic variation voltages for detecting the voltages 131, 133 and 135 in applying the constant currents at the respective temperature conditions, since the detection use power source 71 is used as a constant current source in the characteristic detection.

Figure 11:
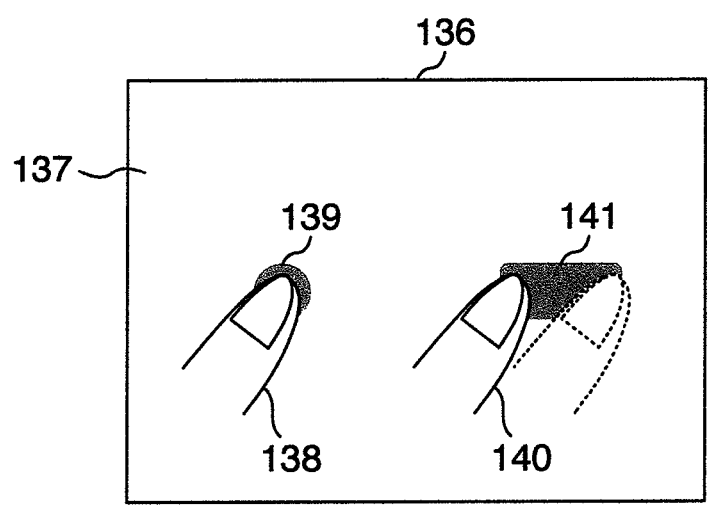
FIG. 11 is an explanatory diagram showing an example applicable to a finger touch operation.

FIG. 11 is a diagram showing an example of applying the invention to a finger touch operation. Referring to FIG. 11, a reference numeral 136 denotes a display area; 137, a non-contact area; 138, a finger contact motion; 139, a finger contact area; 140, a finger rubbing motion; and 141, a finger rubbed area. The finger contact area 139 is turned to a high temperature compared with the non-contact area 137 by the finger contact motion 138. Further, the finger rubbed area 141 is turned to the high temperature compared with the finger contact area 139 by the finger rubbing motion 140.

Hereinafter, a touch panel operation as an input function will be described with use of FIG. 1 to FIG. 11 in the embodiment.

First, a flow of display data will be described with use of FIG. 1. The display/detection control circuit 6 generates the data line control signal 7 and scanning line control signal 8, both of which become a display timing of the self-luminance element display 17, similarly to the conventional manner, in response to the horizontal sync signal 1, vertical sync signal 2, data enable signal 3, and sync clock 5, and also generates the detection scanning line control signal 9 and detection line control signal 10, both of which become a timing of detecting a pixel state in the self-luminance element display 17. Details of the above will be described later. An operation for the data line driving circuit 11, scanning line driving circuit 15 and luminescent voltage generation circuit 13 is the same as conventional manner. The element characteristic detection scanning circuit 18 generates the detection scanning line selecting signal 19 from the detection scanning line control signal 9 to scan the pixels to be detected within a detection time period provided other than the period of conventional display operation. The characteristic variation coordinates detecting circuit 21 judges a condition of a rise in temperature from a condition of the detected line output signal 20 which becomes a characteristic of the pixels on a scanning line selected by the detection scanning line selecting signal 19 to determine a position corresponding to the temperature condition from the detection line control signal 10 and generate the characteristic variation coordinates signal 22 including a condition and address information. Details of the above will be described later. The I/F circuit 23 converts the characteristic variation coordinates signal 22 into the communication I/F communicated with the system side to output as the system communication signal 24.

Details of generating timings of the display/detection control circuit 6 shown in FIG. 1 will be described with use of FIG. 2 and FIGS. 6 to 9.

Referring to FIG. 2, the drive timing generation circuit 27 generates the horizontal start signal 28, horizontal shift clock 29, vertical start signal 30, and vertical shift clock 31, as shown in FIGS. 6 and 8 by the same as conventional manner. On the one-display time period 102 as shown in FIG. 6, the detection timing generation circuit 32 generates the vertical detection start signal 33 and vertical detection shift clock 34, both of which are a timing signal for scanning the detection scanning lines within the detection time period 100 provided separately or other than the display driving time period 101. As shown in FIG. 7, the detection timing generation circuit 32 also generates the horizontal detection start signal 35 and horizontal detection shift clock 36, both of which are a timing signal for, in turn, outputting the pixel states on the selected detection scanning line. Here, in FIGS. 6 and 7, the detection scanning lines for the amount of one-screen are scanned within the detection time period 100, that is, it is defined that the detection for the amount of one-screen is completed within the one-display time period 102. However, the amount of a half or one-fourth of the screen may be scanned if the detection takes much time. In this case, the detection for the amount of one-screen may be completed within a plurality of display time periods. As shown in FIGS. 8 and 9, one-horizontal line may be detected within the detection time period 100. In this case, the detection for the amount of one-screen is completed at the 320th display time period. Therefore, the present invention does not restrict the number of scanning lines to be detected, except that the detection time period 100 is provided separately or other than the display driving time period 101.

A touch panel operation relative to the self-luminance element display 17 and characteristic variation coordinates detecting circuit 21 shown in FIG. 1 will be described with use of FIGS. 3 to 5, 10 and 11 in detail.

Referring to FIG. 3, with the scanning line selection signals, in turn, outputted through the first detection scanning line 65 and second detection scanning line 66, the organic EL elements in the pixels are respectively connected with the first detection line 67, second detection line 68, third detection line 69, fourth detection line 70 up to the 320th detection line (not shown) via the respective detection switches of the pixels to thereby output the respective characteristics as the detection line output signal 20.

Referring to FIG. 4, the detection line output signal 20 is, in turn, shifted and switched in the horizontal direction via the first detection line switch 72, second detection line switch 73, third detection line switch 74 and fourth detection line switch 75, and outputted to the detection output line 76, in response to the first detection line selecting signal 78, second detection line selecting signal 79, third detection line selecting signal 80 and fourth detection line selecting signal 81, each of which is generated by the shift register 77 in response to the detection horizontal start signal 35 and horizontal shift clock 36. At this time, since the organic EL element 63 shown in FIG. 3 is connected with the detection use power source 71 as a constant current source shown in FIG. 4, the organic EL element 63 having the characteristic indicated in FIG. 10 outputs the voltage 131 in applying constant current at the low temperature in the non-contact area 137 shown in FIG. 11 via the detection line output signal 20 and detection output line 76, as touch panel information. The organic EL element 63 also outputs the voltage 133 in applying the constant current at the intermediate temperature in the finger contact area 139 via the same. The organic EL element 63 further outputs the voltage 135 in applying the constant current at the high temperature in the finger rubbed area 141 via the same. In the system side, the voltage in applying the constant current inputted through the detection output line 76 is compared with a voltage threshold value to judge whether the voltage in applying the constant current at the high temperature corresponds to the voltage 131 in applying constant current at the low temperature, or the voltage 133 in applying the constant current at the intermediate temperature, or the voltage 135 in applying the constant current at the high temperature. In response to a judged result, a condition is determined to whether it corresponds to the non-contact, or finger contact motion, or finger rubbing motion.

Referring to FIG. 5, a characteristic voltage of an analog value inputted through the detection output line 76 is converted into a digital value as the characteristic variation detected result 84 by the A/D conversion circuit 83. Such converted digital value as the characteristic variation detected result 84 is outputted, as the characteristic variation coordinates signal 22, together with the vertical coordinates signal 86 generated from the vertical detection start signal 33 and horizontal detection start signal 35 via the vertical count circuit 85 and the horizontal coordinates signal 88 generated from the horizontal detection start signal 35 and horizontal detection sift clock 36 via the horizontal count circuit 87.

According to the operation described above, the characteristic variation coordinates detection circuit 21 in FIG. 1 outputs, as the system communication signal 24, a temperature condition and positional information of a place where a finger contacts a pixel in the self-luminous element display 17 so that it is possible to operate the self-luminous element display 17 as a touch panel. In addition, the embodiment has described an applicable example of using the finger contact and finger rubbing, as an input motion causing a temperature variation. However, various input motions are applicable to the present invention, such as a breath of human causing the temperature variation, a pen for generating a heat, and a non-contacted input like a pointer on a large-sized screen system, but these input motions are not limited to the invention.

[Second Embodiment]

Hereinafter, a second embodiment in the invention will be described with reference to FIGS. 12, 13 and 14.

Figure 12:
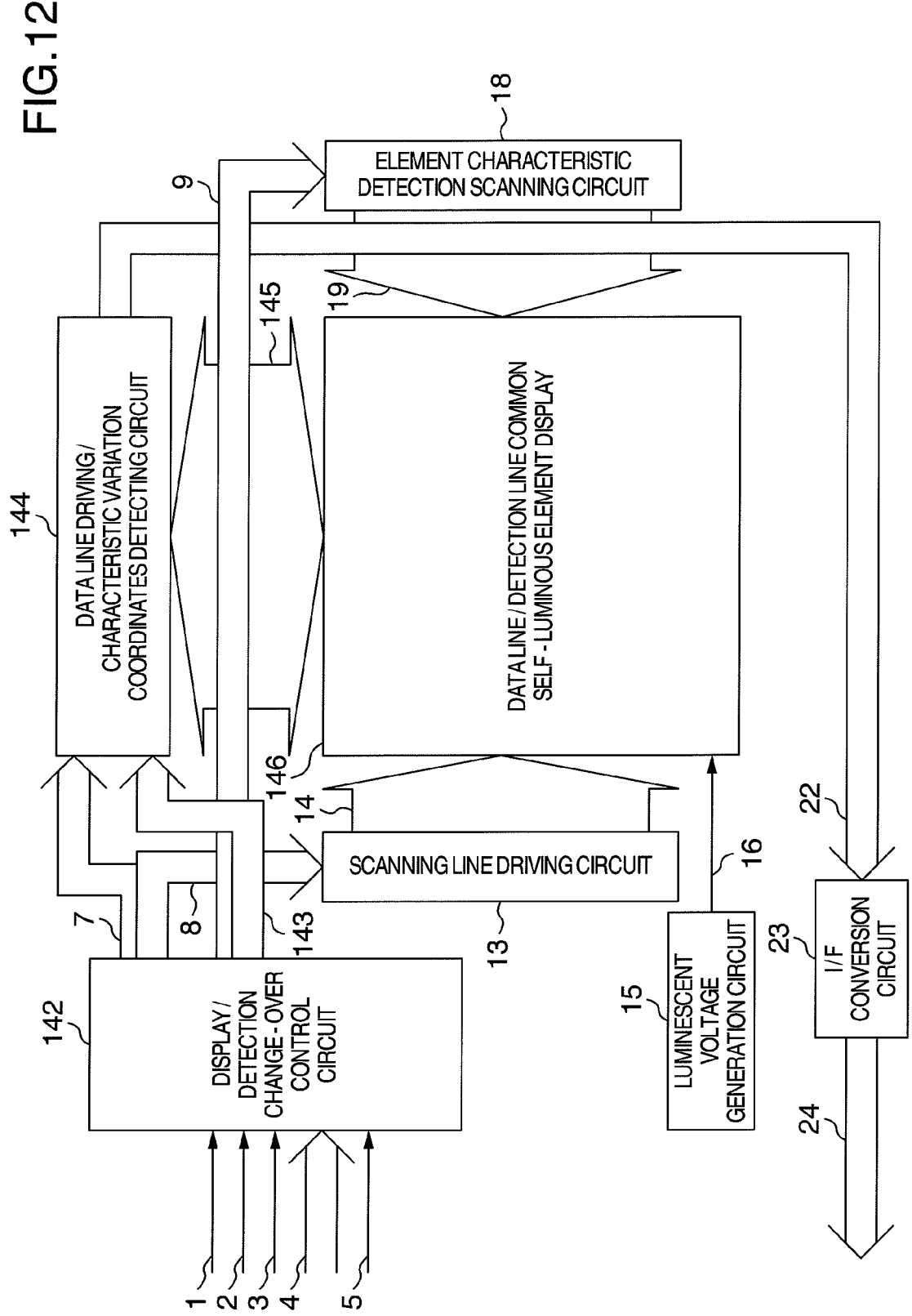
FIG. 12 is a block diagram showing an self-luminous element display device in a second embodiment of the invention.

FIG. 12 shows an example of a self-luminous element display device of the second embodiment in the invention. Referring to FIG. 12, components with the same reference numerals in FIG. 1 correspond to the first embodiment, and are operated as described in the first embodiment. A reference numeral 142 denotes a display/detection change-over control circuit; 143, a display/detection change-over control signal; 144, a data line driving/characteristic variation coordinates detecting circuit; 145, a data line driving/detection line outputting signal; and 146, a data line/detection line common self-luminous element display. The display/detection change-over control circuit 142 generates the data line control signal 7, scanning line control signal 8 and detection scanning line control signal 9, as a conventional manner. The display/detection change-over control circuit 142 also generates the display/detection change-over control signal 143 added a signal for switching the data line drive with the detection operation to the conventional detection line control signal. The data line driving/characteristic variation coordinates detecting circuit 144 has functions of both the conventional data line driving circuit and a black-dotted defect position determining circuit, and connects the data line driving/detection line outputting signal 145 with the data line/detection line common self-luminous element display 146 via the common data line.

Figure 13:
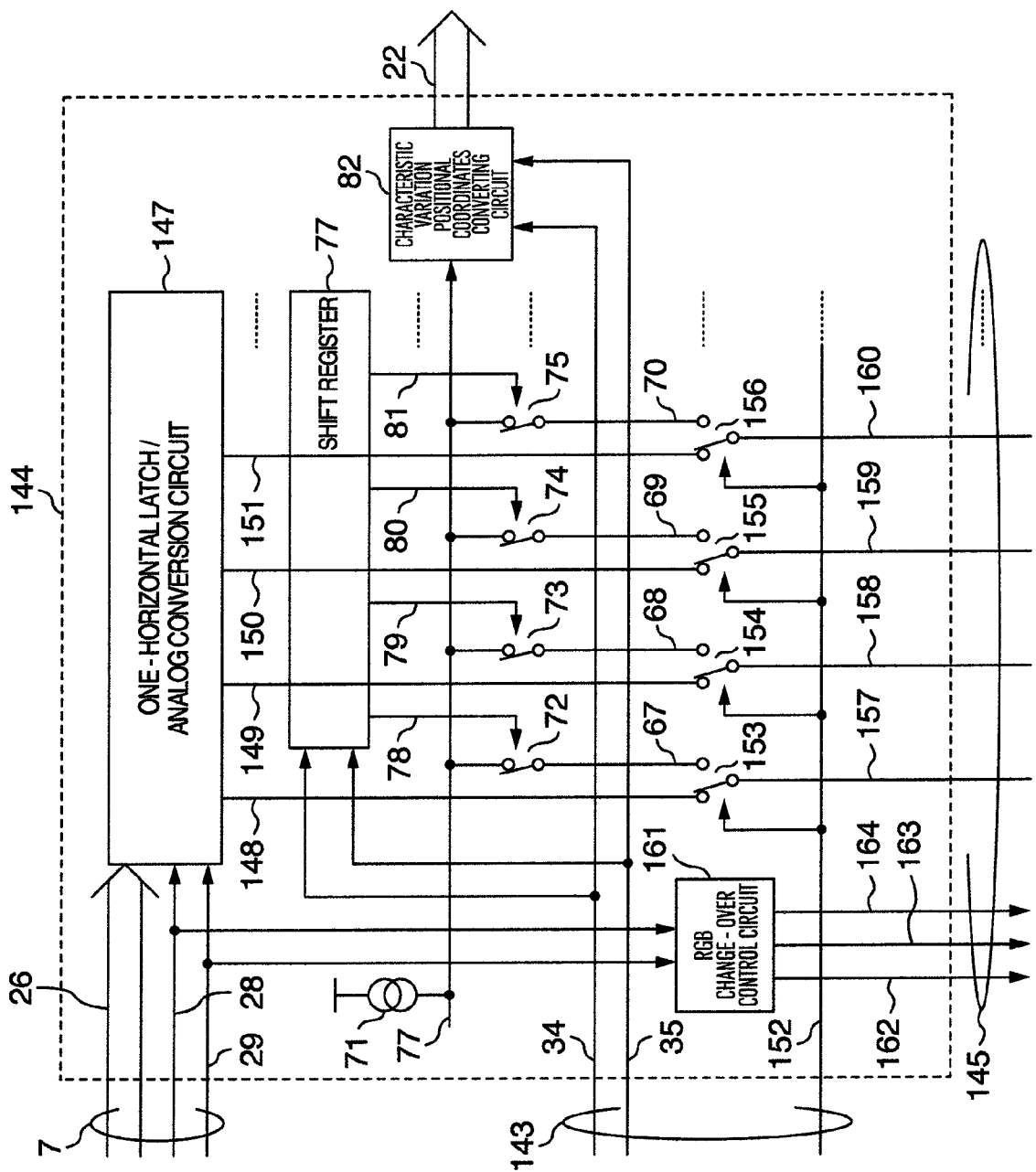
FIG. 13 is a circuit diagram showing an example of an internal constitution of a data line driving/characteristic variation coordinates detecting circuit 144 shown in FIG. 12.

FIG. 13 shows an internal constitution of the data line driving/characteristic variation coordinates detecting circuit 144 of FIG. 12 in this embodiment. Referring to FIG. 13, components with the same reference numerals in FIG. 4 correspond to the first embodiment and are operated as described in the first embodiment. A reference numeral 147 denotes a one-horizontal latch/analog conversion circuit; 148, a first data line drive signal output; 149, a second data line drive signal output; 150, a third data line drive signal output; and 151, a fourth data line drive signal output. Similarly to the conventional manner or the first embodiment, the one-horizontal latch/analog conversion circuit 147 fetches the data line control display data 26 to be inputted in response to the horizontal shift clock 29, as the horizontal start signal 28 is a start, so that data of one-horizontal amount is outputted as the first data line drive signal output 148, second data line drive signal output 149, third data line drive signal output 150, and fourth data line drive signal output 151. Here, the following description will be concerned with assumption so that the data line is outputted up to the 240th data line drive signal output, as described similarly to the first embodiment. A reference numeral 152 denotes a detection switching signal; 153, a first data line detection change-over switch; 154, a second data line detection change-over switch; 155, a third data line detection change-over switch; 156, a fourth data line detection change-over switch; 157, a first data line/detection line; 158, a second data line/detection line; 159, a third data line/detection line; and 160, a fourth data line/detection line. Here, unlike the first embodiment, the number of detection lines is 240 since the detection line is common to the data line. On the display drive, the first data line detection change-over switch 153, second data line detection change-over switch 154, third data line detection change-over switch 155, fourth data line detection change-over switch 156, . . . 240th data line detection change-over switch, output the first data line drive signal output 148, second data line drive signal output 149, third data line drive signal output 150, fourth data line drive signal output 151, . . . 240th data line drive signal output, respectively, in response to the detection switching signal 152. The data line signal outputs 148, 149, 150 and 151 are outputted to the first data line/detection line 157, second data line/detection line 158, third data line/detection line 159, fourth data line/detection line 160, . . . 240th data line/detection line so that the same display operation is performed as the first embodiment. On the detection, the first detection line 67, second detection line 68, third detection line 69, fourth detection line 70, . . . 240th detection line, are connected with the first data line/detection line 157, second data line/detection line 158, third data line/detection line 159, fourth data line/detection line 160, . . . 240th data line/detection line so that the detection operation in the first embodiment is dividedly performed for the R, G and B within the one-horizontal time period. A reference numeral 161 denotes an RGB changeover control circuit; 162, an R display/detection selecting signal; 163, a G display/detection selecting signal; and 164, a B display/detection selecting signal. The RGB change-over control circuit 161 divides a one-horizontal time period into three periods to perform a write of data line signals. Even for the detection, the RGB change-over control circuit 161 also generates the R display/detection selecting signal 162, G display/detection selecting signal 163, and B display/detection selecting signal 164, each of which becomes a change-over signal for each of the three divided periods.

Figure 14:
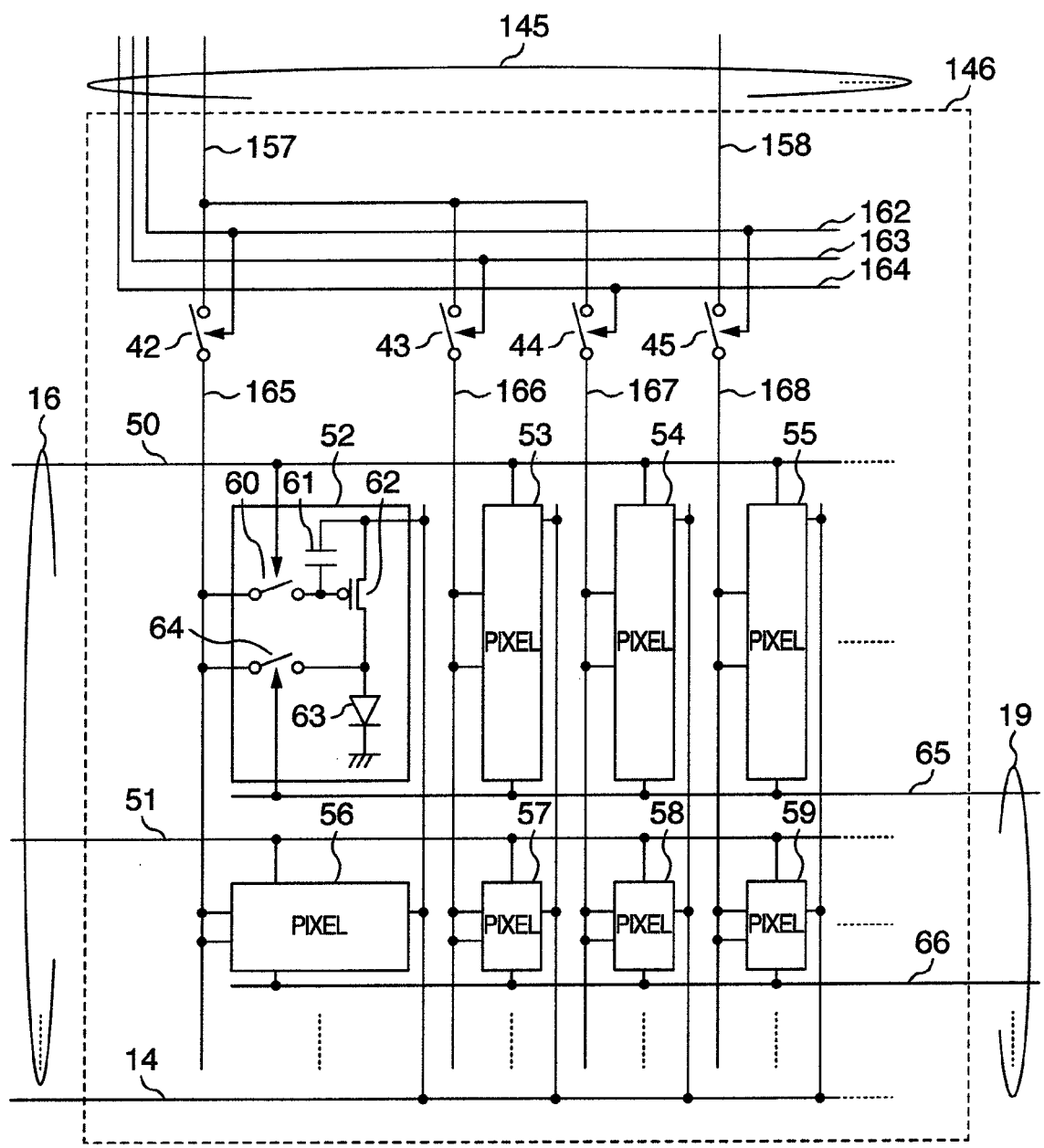
FIG. 14 is a circuit diagram showing an example of an internal constitution of a common data line/detection line self-luminous element display 146 shown in FIG. 12.

FIG. 14 shows an internal constitution of the common data line/detection line self-luminous element display 146 of FIG. 12 in this embodiment. Referring to FIG. 14, components with the same reference numerals in FIG. 3 correspond to the first embodiment and are operated as described in the first embodiment. A reference numeral 162 denotes a first R display/detection common line; 163, a first G display/detection common line; 164, a first B display/detection common line; and 165, a second R display/detection common line. Here, the following description will be concerned with assumption so that each number of the R display/detection common line, G display/detection common line, and B display/detection common line is 240, therefore, total 720 lines are aligned. The first R display/detection common line 162, first G display/detection common line 163, first B display/detection common line 164, second R display/detection common line 165, . . . 240th R display/detection common line, 240th G display/detection common line, and 240th B display/detection common line, are connected with the write capacitors 61 by turning the data write switch 60 in the respective pixels to the On-state on the respective display drives for the pixels, therefore, the same write operation of signal voltage into the pixel is performed as described in the first embodiment. On the detection, the respective display/detection common lines are connected with the organic EL elements 63 by turning the detection switch 64 in the respective pixels to the On-state, so that the same operation of characteristic detection is performed as described in the first embodiment.

As described above, the operation in the second embodiment is the same as the first embodiment, except that the data line and detection line are used in common and switched with each other.

The invention is applicable to a display device of information processing handsets, such as a single display device, mobile telephone, DSC, PDA, etc.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. The image display device including a touch panel input function, comprising:
   a display unit comprised of a plurality of pixels each of which includes a self-luminous element;
   signal lines configured to input a display signal voltage to the pixel;
   a display control circuit configured to control the display signal voltage;
   detection lines configured to output a characteristic of the self-luminous element included in each of the pixels;
   a detection use power source for applying current to the self-luminous element;
   change-over switches; and
   a detection positional coordinates generation circuit,
   wherein the detection use power source is connected with the pixels through the detection lines and the change-over switches,
   wherein the detection lines are connected with the detection positional coordinates generation circuit through the change-over switches, and
   wherein the detection positional coordinates generation circuit configured to output temperature information and a coordinates signal corresponding to one of the pixels on which an input motion causes a temperature variation based on the characteristic of the self-luminous element included in each of the pixels,
   wherein a presence or absence of a touch panel input is determined in response to temperature information output by the detection positional coordinates generation circuit, and
   wherein the absence of touch panel input is determined if the temperature information output by the detection positional coordinates generation circuit is smaller than a first threshold value,
   the presence of touch panel input is determined if the temperature information is larger than the first threshold value or smaller than a second threshold value,
   a sliding motion is determined if the temperature information is larger than the second threshold value.

2. The image display device, including a touch panel input function, comprising:
   a display unit comprised of a plurality of pixels each of which includes a self-luminous element;
   a shared line configured to input a display signal voltage to the pixel and to output a characteristic of the self-luminous element included in each of the pixel;
   a detection circuit configured to detect a characteristic of the self-luminous element included in each of the pixel; and
   a display control circuit configured to control the display signal voltage and to share the shared line with the detection circuit,
   wherein the detection circuit comprises:
   shared change-over switches; a detection use power source for applying current to the self-luminous element; power source change-over switches; and a detection positional coordinates generation circuit,
   wherein the detection use power source is connected with the pixels through the shared line, the shared change-over switches and the power source change-over switches,
   wherein the shared line is connected with the detection positional coordinates generation circuit through the power source change-over switches, and
   wherein the detection positional coordinates generation circuit configured to output temperature information and a coordinates signal corresponding to one of the pixels on which an input motion causes a temperature variation based on the characteristic of the self-luminous element included in each of the pixels,
   wherein a presence or absence of a touch panel input is determined in response to temperature information output by the detection positional coordinates generation circuit, and
   wherein the absence of touch panel input is determined if the temperature information output by the detection positional coordinates generation circuit is smaller than a first threshold value,
   the presence of touch panel input is determined if the temperature information is larger than the first threshold value or smaller than a second threshold value, a sliding motion is determined if the temperature information is larger than the second threshold value.

3. The image display device including a touch panel input function, comprising:
- a display unit comprised of a plurality of pixels each of which includes a self-luminous element;
- signal lines configured to input a display signal voltage to the pixel;
- a display control circuit configured to control the display signal voltage;
- detection lines configured to output a characteristic of the self-luminous element included in each of the pixels; and
- a detection use power source for applying current to the self-luminous element;
- change-over switches;
- a detection positional coordinates generation circuit; and
- a system I/F converting circuit,
- wherein the detection use power source is connected with the pixels through the detection lines and the change-over switches,
- wherein the detection lines are connected with the detection positional coordinates generation circuit,
- wherein the detection positional coordinates generation circuit configured to output temperature information and a coordinates signal corresponding to one of the pixels on which an input motion causes a temperature variation based on the characteristic of the self-luminous element included in each of the pixels, and
- wherein the system I/F converting circuit configured to convert the temperature information and the coordinates signal into a communication signal to a system which is connected with the image display device,
- wherein a presence or absence of a touch panel input is determined in response to temperature information output by the detection positional coordinates generation circuit, and
- wherein the absence of touch panel input is determined if the temperature information output by the detection positional coordinates generation circuit is smaller than a first threshold value,
- the presence of touch panel input is determined if the temperature information is larger than the first threshold value or smaller than a second threshold value,
- a sliding motion is determined if the temperature information is larger than the second threshold value.

4. The image display device including a touch panel input function, comprising:
- a display unit comprised of a plurality of pixels each of which includes a self-luminous element;
- a shared line configured to input a display signal voltage to the pixel and to output a characteristic of the self-luminous element included in each of the pixel;
- a detection circuit configured to detect the characteristic of the self-luminous element included in each of the pixel;
- a display control circuit configured to control the display signal voltage and to share the shared line with the detection circuit; and
- a system I/F converting circuit,
- wherein the detection circuit comprises:
- shared change-over switches;
- a detection use power source for applying current to the self-luminous element;
- power source change-over switches, and a detection positional coordinates generation circuit,
- wherein the detection use power source is connected with the pixels through the shared line, the shared change-over switches and the power source change-over switches,
- wherein the shared line is connected with the detection circuit through the shared change-over switches and the power source change-over switches,
- wherein the detection positional coordinates generation circuit configured to output a temperature information and a coordinates signal corresponding to one of the pixels on which an input motion causes a temperature variation based on the characteristic of the self-luminous element included in each of the pixels, and
- wherein the system I/F converting circuit configured to convert the temperature information and the coordinates signal into a communication signal to a system which is connected with the image display device,
- wherein a presence or absence of a touch panel input is determined in response to temperature information output by the detection positional coordinates generation circuit,
- wherein the absence of touch panel input is determined if the temperature information output by the detection positional coordinates generation circuit is smaller than a first threshold value,
- the presence of touch panel input is determined if the temperature information is larger than the first threshold value or smaller than a second threshold value, and
- a sliding motion is determined if the temperature information is larger than the second threshold value.

* * * * *